(12) United States Patent
Keith et al.

(10) Patent No.: US 7,975,998 B2
(45) Date of Patent: Jul. 12, 2011

(54) PALLET CHANGER AND SYSTEM AND METHOD FOR USING THE SAME

(75) Inventors: Malcolm E. Keith, Algonquin, IL (US); Michael P. Cayley, South Barrington, IL (US)

(73) Assignee: Midaco Corporation, Elk Grove Village, IL (US)

( * ) Notice: Subject to any disclaimer, the term of this patent is extended or adjusted under 35 U.S.C. 154(b) by 1495 days.

(21) Appl. No.: 11/396,977

(22) Filed: Apr. 3, 2006

(65) Prior Publication Data

US 2007/0234546 A1  Oct. 11, 2007

(51) Int. Cl.
*B23P 19/00* (2006.01)
(52) U.S. Cl. ........... 269/309; 29/281.4; 29/559; 29/464; 29/799
(58) Field of Classification Search ........... 29/784, 29/799, 559, 281.1, 281.4, 429, 464, 824; 269/56, 59, 69, 70, 89, 294, 304, 309
See application file for complete search history.

(56) References Cited

U.S. PATENT DOCUMENTS

| | | | |
|---|---|---|---|
| 4,144,960 A | | 3/1979 | Scourtes |
| 4,502,656 A | * | 3/1985 | Zeitler ............... 248/346.03 |
| 4,705,445 A | | 11/1987 | Morita et al. |
| 4,738,439 A | * | 4/1988 | Satake ............... 269/309 |
| 4,747,193 A | * | 5/1988 | Hashidate et al. ....... 29/33 P |
| 4,797,989 A | | 1/1989 | Cherko |
| 4,799,582 A | | 1/1989 | Itoh |
| 4,859,137 A | | 8/1989 | Bonora et al. |
| 4,921,218 A | | 5/1990 | Andre |
| 4,934,031 A | | 6/1990 | Maeda et al. |
| 4,970,765 A | | 11/1990 | Sakawa et al. |
| 4,995,502 A | | 2/1991 | Kitamura |
| 4,996,754 A | | 3/1991 | Kitamura |
| 5,018,617 A | * | 5/1991 | Miyata et al. ............ 198/346.1 |
| 5,038,920 A | | 8/1991 | Nelson |
| 5,044,486 A | | 9/1991 | Kitamura |
| 5,062,190 A | * | 11/1991 | Kitamura ............ 29/33 P |
| 5,067,703 A | | 11/1991 | Keith |
| 5,099,981 A | | 3/1992 | Guzzoni |
| 5,161,662 A | | 11/1992 | Kuse |
| 5,167,405 A | * | 12/1992 | Cayley, Jr. ............ 269/309 |
| 5,249,662 A | | 10/1993 | Nakano et al. |
| 5,259,494 A | | 11/1993 | Hirose |
| 5,286,148 A | * | 2/1994 | Cayley, Jr. ............ 409/219 |

(Continued)

*Primary Examiner* — David P Bryant
*Assistant Examiner* — Christopher M Koehler
(74) *Attorney, Agent, or Firm* — Patent+TMS, P.C.

(57) ABSTRACT

A pallet changer and a system and a method for using the same attach, secure and/or connect a part and/or pallet assembly to a receiver assembly for machining the part. A groove and/or a pull post of the pallet assembly is insertable between a first wedge arm and a second wedge arm in an interior of the receiver assembly. Springs within the interior of the receiver assembly exert forces against the first wedge arm and the second wedge arm to maintain the first wedge arm and/or the second wedge arm in a first position within the interior of the receiver assembly. A key and/or a cam moves and/or rotates to move the first wedge arm and/or the second wedge arm from the first position to a second position. A first tapering on the pallet assembly engages and/or corresponds to a second tapering on the first wedge arm and/or the second wedge arm to secure and/or to attach the pallet assembly to the receiver assembly in the second position. A first plate attached to the interior of the receiver assembly prevents the cam from rotating the first wedge arm within the interior of the receiver assembly. A second plate connected to a passage of the receiver assembly prevents the key from being removed from the receiver assembly with the first wedge arm and/or the second wedge arm in the first position.

7 Claims, 7 Drawing Sheets

U.S. PATENT DOCUMENTS

| | | |
|---|---|---|
| 5,346,051 A | 9/1994 | Keith |
| 5,370,212 A | 12/1994 | Misutani et al. |
| 5,402,862 A | 4/1995 | Rosenkranz |
| 5,429,461 A | 7/1995 | Mukherjee et al. |
| 5,492,214 A | 2/1996 | Keith |
| 5,611,650 A * | 3/1997 | Perkins et al. .................. 408/87 |
| 5,702,222 A | 12/1997 | Rosen |
| 5,813,514 A | 9/1998 | Keith |
| 5,826,692 A * | 10/1998 | Blanc ........................ 198/346.1 |
| 5,829,356 A | 11/1998 | Christiansson |
| 6,193,048 B1 | 2/2001 | Keith |
| 6,464,068 B1 | 10/2002 | Keith |

\* cited by examiner

PALLET CHANGER AND SYSTEM AND
METHOD FOR USING THE SAME

BACKGROUND OF THE INVENTION

The present invention generally relates to a pallet changer and a system and a method for using the same. More specifically, the present invention relates to a pallet changer and a system and a method for using the same which may attach, may connect and/or may secure a pallet assembly to a receiver assembly for inserting into a machine compartment. The pallet assembly may have a base with an arm, a groove and/or a pull post for inserting into the receiver assembly. The pull post of the pallet assembly may have a first tapering for inserting between a first wedge arm and a second wedge arm of the receiver assembly. The first tapering on the pull post may correspond to and/or may match a second tapering on the first wedge arm and/or the second wedge arm. Springs of the receiver assembly may apply a force to the first wedge arm and/or the second wedge arm to attach and/or to connect the pallet assembly to the receiver assembly.

The receiver assembly may have a cam which may be mechanically connected to the first wedge arm and/or the second wedge arm. The cam may be moved to and/or may be rotated to an open position to move the first wedge arm outwardly with respect to the second wedge arm for inserting or for removing the arm and/or the pull post of the pallet assembly from the receiver assembly. The cam may be moved and/or may be rotated to a closed position to move the first wedge arm inwardly with respect to the second wedge arm for connecting, for attaching and/or for securing the arm and/or the pull post of the pallet assembly to the receiver assembly. A first plate may be attached to the receiver assembly to prevent movement and/or rotation of the first wedge arm and/or the second wedge arm with respect to the receiver assembly. A second plate may be connected to a passage in the receiver assembly for preventing movement of the cam between the open position and the closed position.

It is generally known to provide a pallet changer to insert and to remove a part from a machine compartment for machining of the part. The part is attached to a removable plate of the pallet changer for inserting and for removing the part with respect to the machine compartment. The removable plate of the pallet changer is inserted into, is connected to, is attached to and/or is secured to a base unit and/or a roller unit. The base unit and/or the roller unit is moved from a first position to a second position for inserting and/or for removing the removable plate and/or the part with respect to the machine compartment.

Traditionally, air lines and/or electrical lines are attached to and/or are connected to a removable plate, the base unit and/or the roller unit to connect the removable plate and/or the part to the base unit and/or the roller unit. The air lines and/or the electrical lines limits movement of the pallet assembly with respect to the machine compartment and/or the roller assembly. Electrical switches are attached to and/or are connected to the pallet changer to confirm that the removable plate and/or the part is attached to and/or is secured to the base unit and/or the roller unit. The part is not machined and/or is not moved within the machine compartment without confirmation and/or without signaling from the electrical switches.

After the removable plate and the part are inserted into the machine compartment and the electrical switches confirm that the removable plate and the part are secured, the removable plate, the base unit, the roller unit and/or the part moves along a first axis, a second axis and/or a third axis inside the machine compartment for machining the part. The first axis permits the removable plate and the part to move between a left end and a right end of the machine compartment for machining the part. The second axis permits the removable plate and the part to move between a rear end and a front end of the machine compartment for machining the part. The third axis permits the removable plate and the part to move between a top end and a bottom end of the machine compartment for machining the part.

The air lines and/or the electrical lines attached to the pallet changer limits the movement of the part to two-axis movement which includes the first axis and the second axis or to three-axis movement which includes the first axis, the second axis and the third axis inside the machine compartment. Further, the electrical switches of the pallet changer may limit the movement of the part to the two-axis movement or the three-axis movement inside the machine compartment. However, the part may require four-axis movement or five-axis movement inside the machine compartment for machining the part. A fourth axis of the four-axis movement permits an end of the part to move and/or to rotate in a clockwise direction or a counter-clockwise direction with respect to a center of the part or a center of the removable plate for machining the part. A fifth axis of the five-axis movement permits the removable plate and the part to move in a swing-like movement inside the machine compartment for machining the part. Still further, the machine compartment may have a height which may be less than the height of the pallet changer. As a result, the pallet changer and the part may be incapable of being inserted into the machine compartment for machining the part.

A need, therefore, exists for a pallet changer and a system and a method for using the same which may attach and/or may secure a pallet assembly to a receiver assembly for machining a part without air lines, without electrical lines and/or electrical switches. Further, a need exists for a pallet changer and a system and a method for using the same which may be receivable by and/or insertable into a machine compartment for machining a part on the pallet changer. Still further, a need exists for a pallet changer and a system and a method for using the same which may provide for movement of the pallet changer and/or a part attached to the pallet changer in a four-axis movement or a five-axis movement within a machine compartment for machining the part. Moreover, a need exists for a pallet changer and a system and a method for using the same which may provide wedge arms, springs, a groove and/or a pull post to connect, to attach and/or to secure a pallet assembly to a receiver assembly and/or a surface of a machine. Furthermore, a need exists for a pallet changer and a system and a method for using the same which may provide a cam, a first plate and/or a second plate for moving wedge arms of a receiver assembly between an open position and a closed position to attach and/or to separate a pallet assembly and the receiver assembly.

SUMMARY OF THE INVENTION

The present invention generally relates to a pallet changer and a system and a method for using the same. Further, the pallet changer and/or the system may have a pallet assembly which may be attachable to, insertable into and/or connectable to a receiver assembly and/or a surface of a machine. The pallet assembly may have a tapering on a pull post which may correspond to a tapering on wedge arms of the receiver assembly for attaching, for connecting and/or for securing the pallet assembly to the receiver assembly. A shaft and/or a cam may be connected to the wedge arms for moving the receiver assembly between an open position and a closed position. The pull post and/or a groove of the pallet assembly may be inserted into and/or may be removed from the wedge arms of the receiver assembly with the receiver assembly in the open position. The pull post and/or the groove of the pallet assembly may be attached to, may be secured to and/or may be locked inside the receiver assembly via the wedge arms with the receiver assembly in the closed position. A first plate and/or a second plate may be attached to and/or may be connected to the receiver assembly for attaching, for securing, for locking and/or for connecting the pallet assembly to the receiver assembly.

To this end, in an embodiment of the present invention, an apparatus for securing a part wherein the part is machinable by a tool is provided. The apparatus has a pallet assembly having a uniform thickness defined between a top side and a bottom side wherein the pallet assembly has a post attached to the bottom side wherein the part is placed on the top side of the pallet assembly. Further, the apparatus has a receiver assembly having a uniform height defined between a top side and a bottom side wherein a compartment is formed in the receiver assembly wherein an opening is formed in the top side of the receiver assembly wherein the opening extends inwardly from the top side of the receiver assembly through the receiver assembly to the compartment of the receiver assembly. Moreover, the apparatus has a cam connected to the receiver assembly wherein the cam is located in the compartment of the receiver assembly wherein the cam moves the receiver assembly between a locked position and an unlocked position wherein the post of the pallet assembly is insertable into the compartment of the receiver assembly with the receiver assembly in the unlocked position and further wherein the pallet assembly is attachable to the receiver assembly with the receiver assembly in the locked position.

In an embodiment, the apparatus has a spring connected to the receiver assembly wherein the spring is located in the compartment of the receiver assembly wherein the spring attaches the post of the pallet assembly to the receiver assembly.

In an embodiment, the apparatus has a pin attached to the receiver assembly wherein the pin aligns the part with respect to the receiver assembly.

In an embodiment, the apparatus has arms connected to the receiver assembly wherein the arms are located in the compartment of the receiver assembly wherein the arms attach the pallet assembly to the receiver assembly.

In an embodiment, the apparatus has a groove formed on the pallet assembly wherein the groove is located between the post of the pallet assembly and the bottom side of the pallet assembly wherein the pallet assembly is attached to the receiver assembly at the groove.

In an embodiment, the apparatus has a plate attached to the receiver assembly wherein the plate prevents the receiver assembly from being moved to the unlocked position.

In another embodiment of the present invention, a system for securing a part wherein the part is machinable by a tool is provided. The system has a pallet assembly having a thickness defined between a top side and a bottom side wherein the pallet assembly has a post attached to the bottom side wherein the tool is place on the top side of the pallet assembly. Further, the system has a receiver assembly having a height defined between a top side and a bottom side wherein a compartment is formed in the receiver assembly. Moreover, the system has a first arm attached to the receiver assembly wherein the first arm is located in the compartment of the receiver assembly wherein the first arm moves between a first position to a second position wherein the post of the pallet assembly is insertable into the compartment of the receiver assembly with the first arm in the first position and further wherein the pallet assembly is attachable to the receiver assembly with the first arm in the second position.

In an embodiment, the system has a plate attached to the receiver assembly wherein the plate prevents the first arm from moving between the first position and the second position.

In an embodiment, the system has a key connectable to the cam wherein the key moves the first arm between the first position and the second position.

In an embodiment, the system has a groove in the pallet assembly wherein the groove is located between the bottom side of the pallet assembly and the post.

In an embodiment, the system has a second arm attached to the first arm wherein the cam is located between the first arm and the second arm.

In an embodiment, the pallet assembly has a tapered surface angled in a range between five degrees and ten degrees wherein the tapered surface attaches the pallet assembly to the receiver assembly.

In an embodiment, the system has a spring connected to the first arm and the receiver assembly wherein the spring attaches the pallet assembly to the receiver assembly.

In another embodiment of the present invention, a method for using a pallet changer to secure a part to the pallet changer wherein the part is machinable by a tool is provided. The method has the step of providing a receiver assembly having a front side and a uniform height defined between a top side and a bottom side wherein a compartment is formed in the receiver assembly wherein the receiver assembly has arms wherein the arms move between an unlocked position and a locked position. Further, the method has the step of inserting a pallet assembly into the compartment of the receiver assembly with the arms in the unlocked position wherein a groove is formed on the pallet assembly wherein the groove is located between the arms. Moreover, the method has the step of moving the arms from the unlocked position to the locked position wherein the arms abut the groove of the pallet assembly wherein the pallet assembly is attached to the receiver assembly.

In an embodiment, the method has the step of attaching the part to the pallet assembly wherein the pallet assembly is located between the part and the receiver assembly.

In an embodiment, the method has the step of machining the part wherein the part is connected to the receiver assembly with the pallet assembly and the arms of the receiver assembly.

In an embodiment, the method has the step of positioning springs between the arms and the receiver assembly wherein the springs attach the pallet assembly to the receiver assembly.

In an embodiment, the method has the step of connecting a key to the arms wherein the key rotates to move the arms between the locked position and the unlocked position.

In an embodiment, the method has the step of positioning a cam between the arms wherein the cam moves the arms between the unlocked position and the locked position.

In an embodiment, the method has the step of forming a handle on the pallet assembly wherein the handle corresponds to the front side of the pallet assembly.

It is, therefore, an advantage of the present invention to provide a pallet assembly and a system and a method for using the same.

Another advantage of the present invention is to provide a pallet changer and a system and a method for using the same which may secure, may attach, may connect and/or may lock a pallet assembly to a receiver assembly without air lines, electrical lines and/or electrical switches.

And, another advantage of the present invention is to provide a pallet changer and a system and a method for using the same which may provide a pallet assembly and a receiver assembly for inserting into a machine compartment to machine a part.

Yet another advantage of the present invention is to provide a pallet changer and a system and a method for using the same which may move the pallet changer and/or a part in a four-axis movement and/or a five-axis movement with a machine compartment for machining a part.

A further advantage of the present invention is to provide a pallet changer and a system and a method for using the same which may have a first tapering on a pull post of a pallet assembly corresponding to a second tapering on wedge arms in an interior of a receiver assembly.

A still further advantage of the present invention is to provide a pallet changer and a system and a method for using the same which may have wedges arms and/or springs in an interior of a receiver assembly for attaching, for securing and/or for connecting a pallet assembly to the receiver assembly.

Moreover, an advantage of the present invention is to provide a pallet changer and a system and a method for using the same which may have a key and/or a cam for moving wedge arms of a receiver assembly between an open position and a closed position.

And, another advantage of the present invention is to provide a pallet changer and a system and a method for using the same which may have bushings in a pallet assembly for receiving pins of a receiver assembly to align the pallet assembly and the receiver assembly.

Yet another advantage of the present invention is to provide a pallet changer and a system and a method for using the same which may have handles and/or grooves on a side of a pallet assembly for aligning the pallet assembly and a receiver assembly.

Another advantage of the present invention is to provide a pallet changer and a system and a method for using the same which may have bushings of a pallet assembly separated by an angle for align the pallet assembly and a receiver assembly.

Yet another advantage of the present invention is to provide a pallet changer and a system and a method for using the same which may a first wedge arm and a first spring connected to a second wedge arm and a second spring within an interior of a receiver assembly for securing a pallet assembly to the receiver assembly.

A still further advantage of the present invention is to provide a pallet changer and a system and a method for using the same which may have a plate connected to an interior of a receiver assembly to prevent and/or to limit movement of and/or rotation of wedge arms within the interior of the receiver assembly.

Moreover, an advantage of the present invention is to provide a pallet changer and a system and a method for using the same which may have a plate connected to a passage in a receiver assembly to prevent removal of a key from the passage with the receiver assembly in an open position.

And, another advantage of the present invention is to provide a pallet changer and a system and a method for using the same which may have a groove on a key to prevent removal of the key from a passage in a receiver assembly with the receiver assembly in an open position.

Yet another advantage of the present invention is to provide a pallet changer and a system and a method for using the same which may have a first tapering on a pull post and a second tapering on a wedge arms to securing the pull post to the wedge arms.

A further advantage of the present invention is to provide a pallet changer and a system and a method for using the same which may have passages through a cover of a receiver assembly for draining coolant and/or fluids from the receiver assembly.

A still further advantage of the present invention is to provide a pallet changer and a system and a method for using the same which may rotate a cam to move a first wedge arm inward or outward with respect to a second wedge arm to close or to open, respectively, the pallet changer.

Moreover, an advantage of the present invention is to provide a pallet changer and a system and a method for using the same which may have dowel in a cover of a receiver assembly to align the cover with the receiver assembly.

And, another advantage of the present invention is to provide a pallet changer and a system and a method for using the same which may have surfaces of the pallet changer with hardnesses between a range of fifty rockwell and sixty rockwell.

Yet another advantage of the present invention is to provide a pallet changer and a system and a method for using the same which may a groove on a pallet assembly for receiving a wedge arm of a receiver assembly to connect, to attach and/or to secure the pallet assembly to the receiver assembly.

A further advantage of the present invention is to provide a pallet changer and a system and a method for using the same which may have a spring applying a force to a first wedge arm for moving the first wedge arm inwardly with respect to a second wedge arm.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a pallet changer and a system and a method for using the same. More specifically, the present invention relates to a pallet changer and a system and a method for using the same which may attach, may secure and/or may connect a part and/or a pallet assembly to a receiver assembly for machining the part. A groove and/or a pull post of the pallet assembly may be inserted between a first wedge arm and a second wedge arm in an interior of the receiver assembly. Springs within the interior of the receiver assembly may exert and/or may apply forces against the first wedge arm and the second wedge arm to maintain the first wedge arm and/or the second wedge arm in a first position. A key and/or a cam may move and/or may rotate to move the first wedge arm and/or the second wedge arm from the first position to a second position. A tapering on the pallet assembly may engage and/or may correspond to a tapering on the first wedge arm and/or the second wedge arm to lock, to secure, to attach and/or to connect the pallet assembly to the receiver assembly in the second position. A first plate attached to the interior of the receiver assembly may prevent the cam from rotating the first wedge arm within the interior of the receiver assembly. A second plate connected to a passage of the receiver assembly may prevent the key from being removed from the receiver assembly with the first wedge arm and/or the second wedge arm in the first position.

Figure 1:
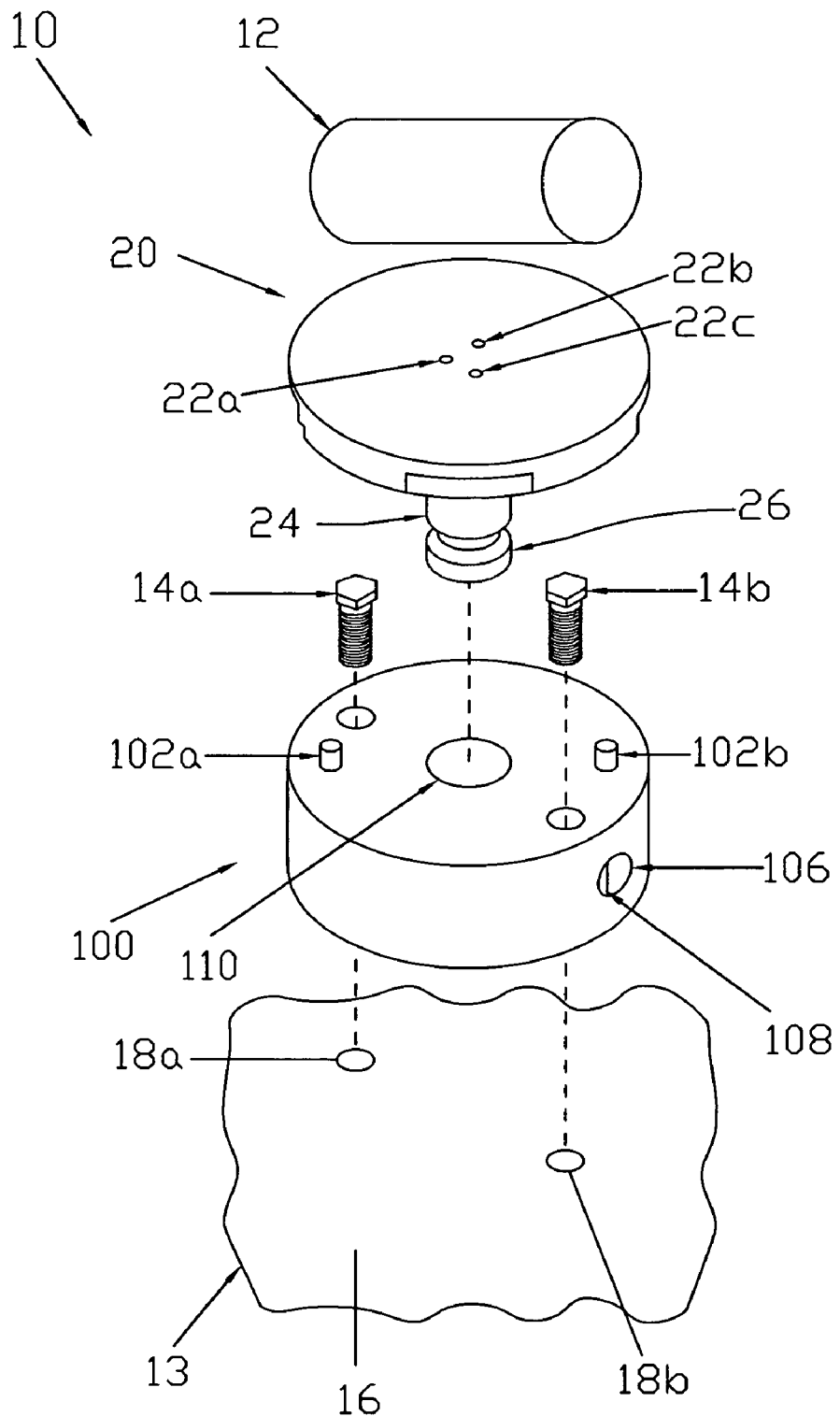
FIG. 1 illustrates an exploded perspective view of a system in an embodiment of the present invention.

Referring now to the drawings wherein like numerals refer to like parts, FIG. 1 illustrates a system 10 to secure, to connect and/or to attach a part 12 to a surface 16 of a machine 13 for machining the part 12. The part 12 may be machined by a tool (not shown in the figures) within a machine compartment (not shown in the figures). The tool may be attached to and/or may be connected to a tool spindle (not shown in the figures) inside the machine compartment. The tool may be, for example, a mill, an end mill, a shell mill, a face mill, a drill, a spotting drill, a tap, a boring bar and/or the like. It should be understood the tool may be any tool which may be capable of machining the part 12 within the machine compartment as known to one of ordinary skill in the art.

Figure 2:
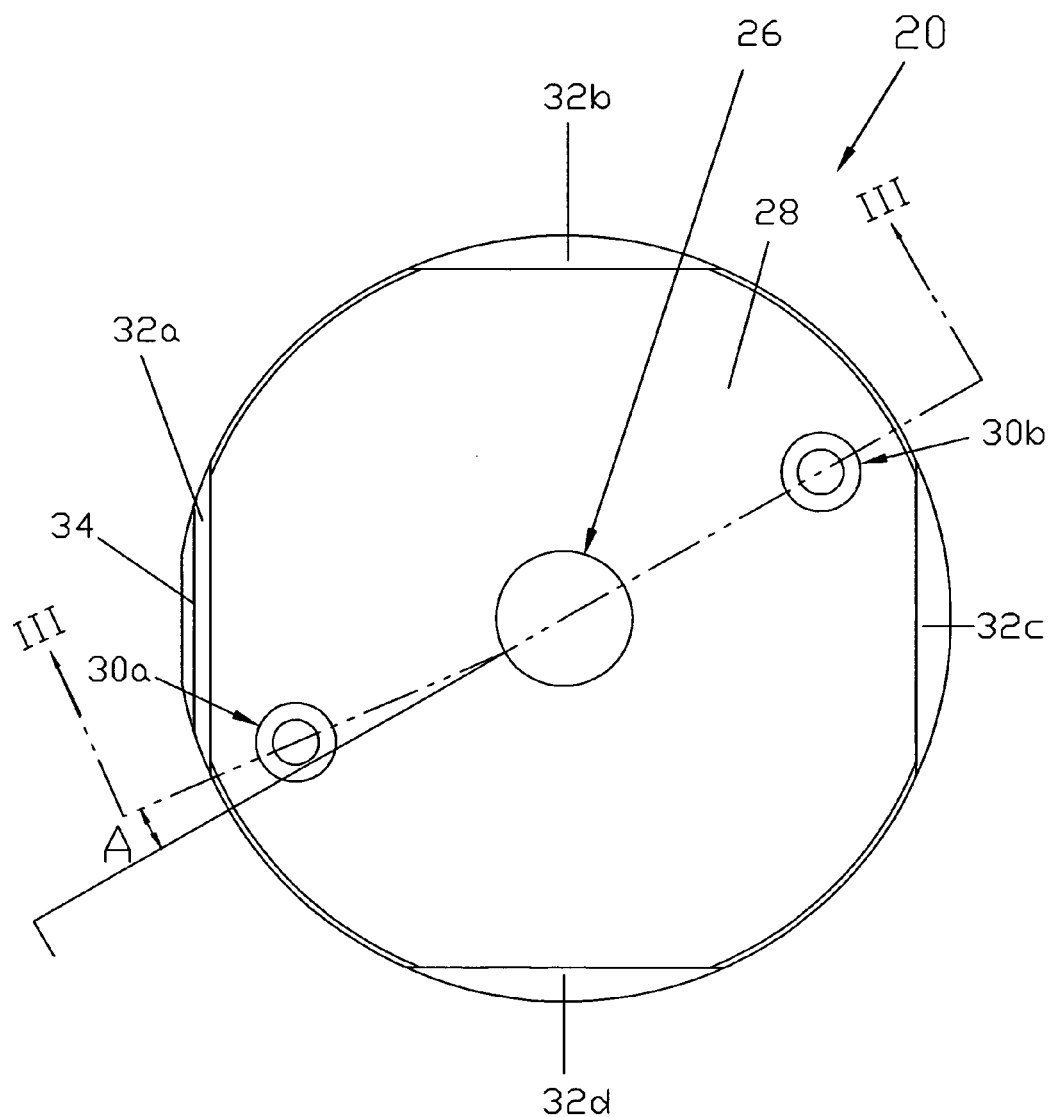
FIG. 2 illustrates a bottom plan view of a pallet assembly in an embodiment of the present invention.
Figure 3:
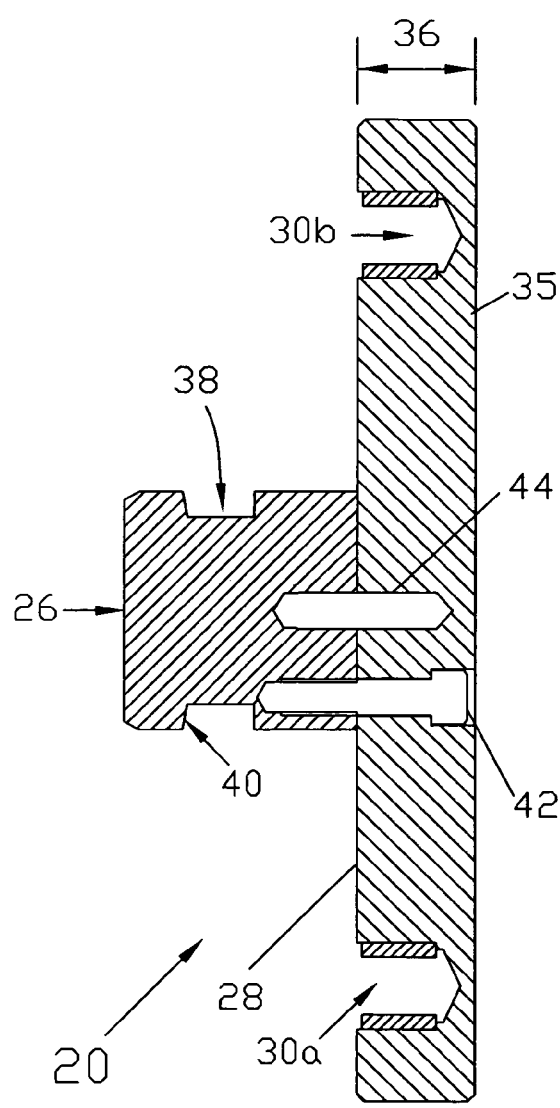
FIG. 3 illustrates a cross-sectional view taken generally along line III-III of the pallet assembly of FIG. 2 in an embodiment of the present invention.
Figure 4:
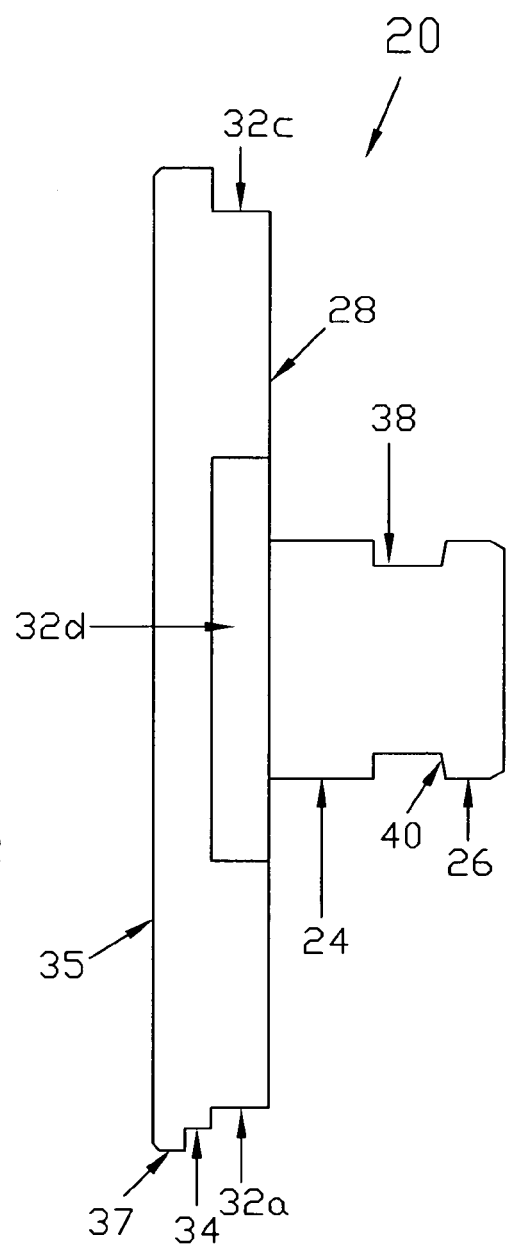
FIG. 4 illustrates a side plan view of a pallet assembly in an embodiment of the present invention.

The system 10 may have a pallet assembly 20 and/or a receiver assembly 100 for attaching, for connecting and/or for securing the part 12 to the machine 13. The pallet assembly 20 may have a top side 35 and a bottom side 28 as illustrated in FIGS. 2-4. The top side 35 of the pallet assembly 20 may have openings 22a-22c for fastening, for connecting, for attaching and/or for securing the part 12 to the top side 35 of the pallet assembly 20. The bottom side 28 of the pallet assembly 20 may have an arm 24 and/or a pull post 26 extending outwardly with respect to the bottom side 28 of the pallet assembly 20 for attaching the pallet assembly 20 to the receiver assembly 100 and/or the machine 13.

Figure 5:
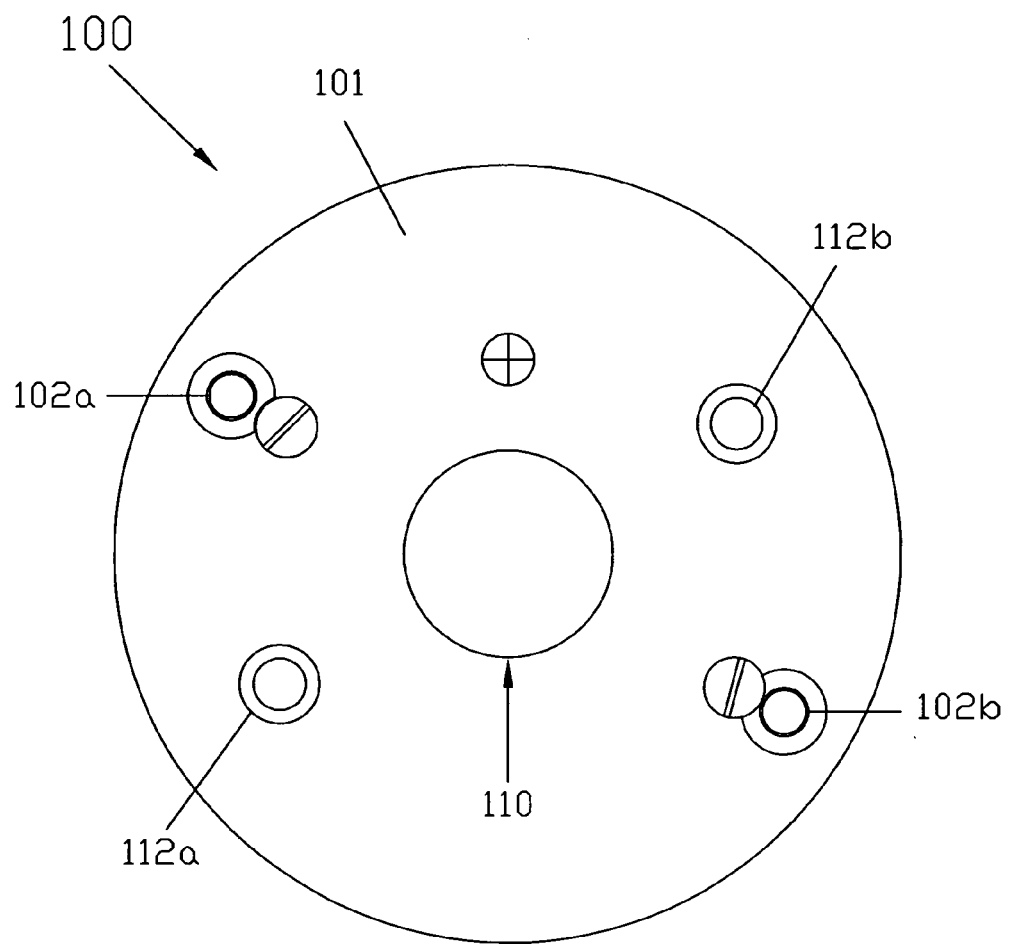
FIG. 5 illustrates a top plan view of a receiver assembly in an embodiment of the present invention.
Figure 6:
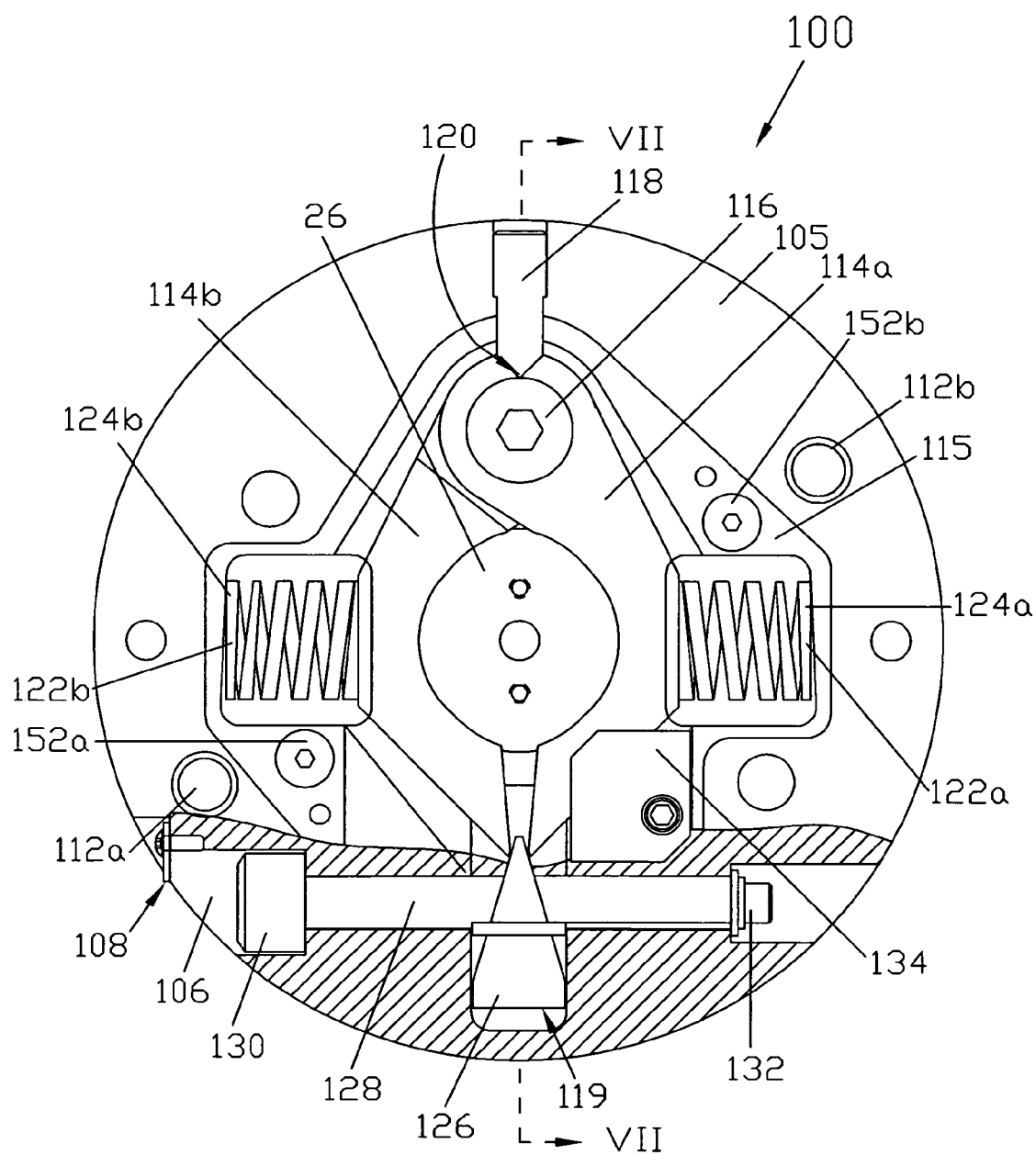
FIG. 6 illustrates a bottom plan view of a receiver assembly in an embodiment of the present invention.
Figure 7:
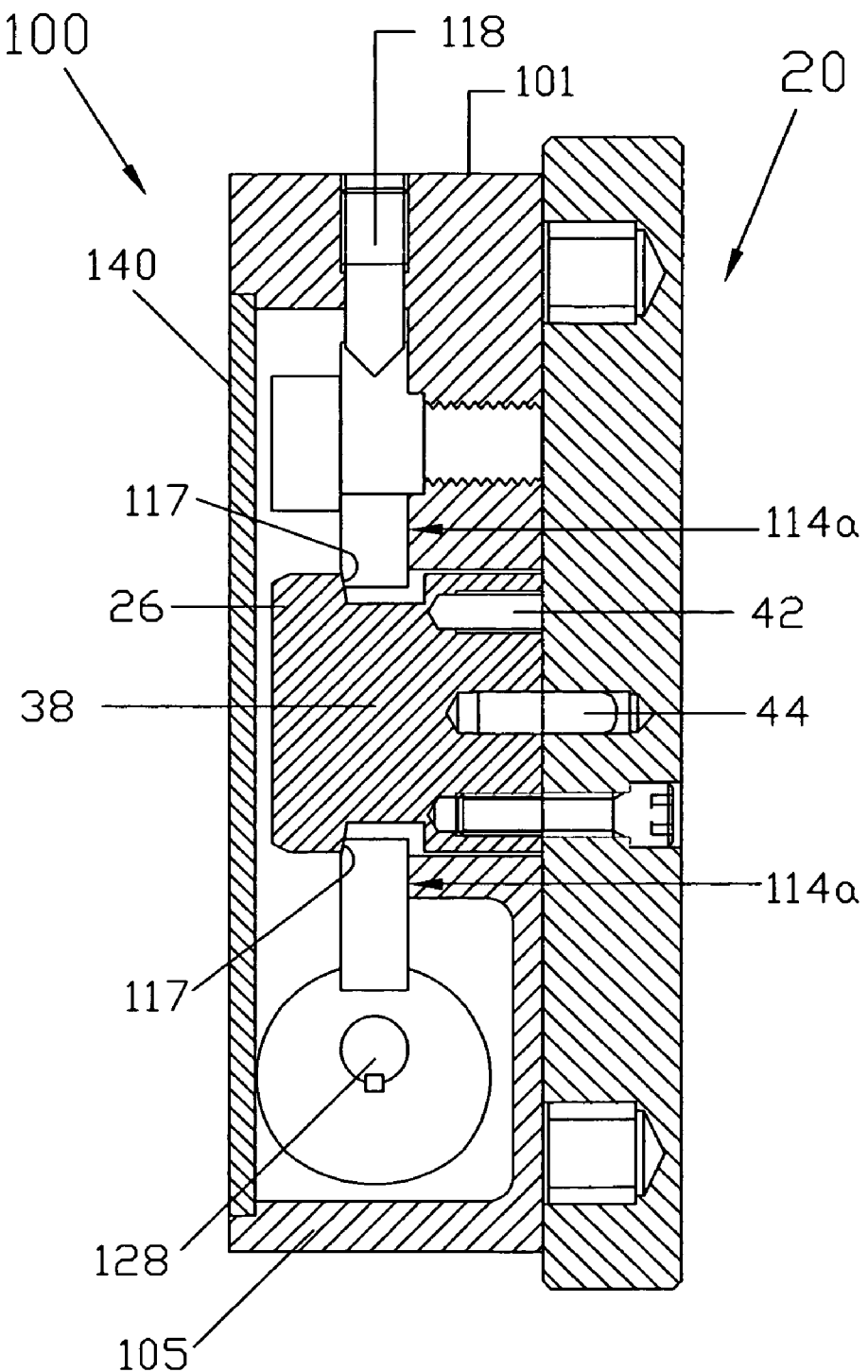
FIG. 7 illustrates a cross-sectional view taken generally along line VII-VII of the receiver assembly of FIG. 6 in an embodiment of the present invention.
Figure 8:
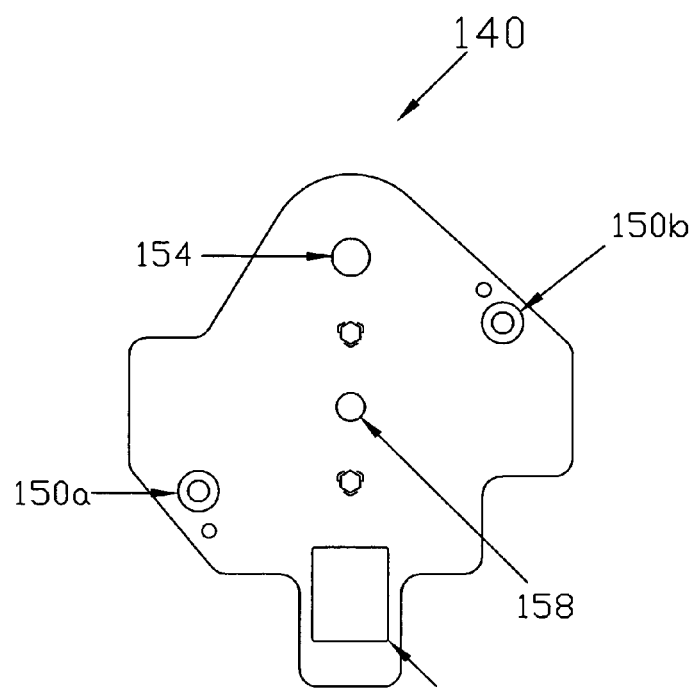
FIG. 8 illustrates a bottom plan view of a cover for a receiver assembly in an embodiment of the present invention.

The receiver assembly 100 may have a top side 101 and a bottom side 105 as illustrated in FIGS. 5-7. The top side 101 of the receiver assembly 100 may have a first pin 102a and/or a second pin 102b (collectively referred to hereinafter as "the pins 102a, 102b") extending outwardly with respect to the top side 101 for aligning and/or for connecting the pallet assembly 20 and the receiver assembly 100. The receiver assembly 100 may have a passage 106 for accessing, for contacting, for moving, for rotating and/or for engaging a cam 126 as illustrated in FIGS. 6 and 7 to move the receiver assembly 100 between an unlocked position and a locked position. A lock plate 108 may be connected to, may be adjacent to and/or may restrict access to the passage 106 of the receiver assembly 100. The lock plate 108 may partially cover the passage 106 of the receiver assembly 100.

The receiver assembly 100 may have an opening 110 which may extend from the top side 101 through the receiver assembly 100 to the bottom side 105 of the receiver assembly 100. The opening 110 may be sized to receive the arm 24 and/or the pull post 26 of the pallet assembly 20 for attaching and/or for connecting the receiver assembly 100 and the pallet assembly 20. The receiver assembly 100 may have a compartment 115 extending from the bottom side 105 inwardly with respect to the top side 101 of the receiver assembly 100 as illustrated in FIG. 6. The passage 106, the cam 126 and/or the opening 110 may be connected to the compartment 115 of the receiver assembly 100 for attaching, for connecting and/or for securing the arm 24 and/or the pull post 26 of the pallet assembly 20 to the receiver assembly 100. The arm 24 and/or the pull post 26 may be inserted into the opening 110 and/or the compartment 115 of the receiver assembly 100. As a result, the pallet assembly 20 may be attached to, may be connected to and/or may be secured to the receiver assembly 100 via the opening 110, the compartment 115, the cam 126, the arm 24 and/or the pull post 26.

The receiver assembly 100 may have holes 112a, 112b extending from the top side 101 through the receiver assembly 100 to the bottom side 105 of the receiver assembly 100 as illustrated in FIGS. 5 and 6. Fasteners 14a, 14b may be inserted into the holes 112a, 112b, respectively, of the receiver assembly 100 to attach, to connect and/or to secure the receiver assembly 100 to the machine 13 as shown in FIGS. 1 and 5. The fasteners 14a, 14b may be, for example, a screw, a bolt and/or the like. It should be understood that the fasteners 14a, 14b may be any fasteners capable of attaching and/or of securing the receiver assembly 100 to the machine 13 as known to one of ordinary skill in the art.

The fasteners 14a, 14b may extend outwardly with respect to the bottom side 105 of the receiver assembly 100 for attaching, for connecting and/or for securing the receiver assembly 100 to the machine 13. The fasteners 14a, 14b may be inserted into, may be attached to and/or may be secured to holes 18a, 18b, respectively, on the surface 16 of the machine 13. As a result, the pallet assembly 20, the receiver assembly 100 and/or the machine 13 may be attached and/or may be connected via the fasteners 14a, 14b and/or the holes 112a, 112b, respectively.

FIG. 2 illustrates the bottom side 28 of the pallet assembly 20 in an embodiment of the present invention. The pallet assembly 20 may have a first bushing 30a and/or a second bushing 30b (collectively referred to hereinafter as "the bushings 30a, 30b") extending from the bottom side 28 inwardly with respect top side 35 of the pallet assembly 20. The arm 24 and/or the pull post 26 may be centered with respect to the bottom side 28 of the pallet assembly 20.

The bottom side 28 of the pallet assembly 20 may have handles 32a-32d as shown in FIG. 2. Each of the handles 32a-32d may extend from the bottom side 28 inwardly with respect to the top side 35 of the pallet assembly 20 as shown in FIG. 4. A user (not shown in the figures) may lift, may handle, may move and/or may hold the pallet assembly 20 via one or more of the handles 32a-32a to position and/or to align the pallet assembly 20 with respect to the receiver assembly 100.

A flap 34 may be formed on and/or may be located on the handle 32a of the pallet assembly 20 as illustrated in FIGS. 2 and 4. The flap 34 may extend from the handle 32a inwardly with respect to the top side 35 of the pallet assembly 20 as shown in FIG. 4. The flap 34 and/or the handle 32a may correspond to and/or may indicate a front side 37 of the pallet assembly 20. The user may locate and/or may identify the front side 37 of the pallet assembly 20 by locating the flap 34 and/or the handle 32a of the pallet assembly 20. The bushings 30a, 30b may correspond to and/or may align with the pins 102a, 102b, respectively. The user may align the front side 37 of the pallet assembly 20 with a front of the part 12, of the machine 13 and/or of the receiver assembly 100 via the flap 34 and/or the handle 32a. As a result, the user may attach and/or may connect the pallet assembly 20 and the receiver assembly 100 with the front side 37 of the pallet assembly 20 adjacent to the front of the receiver assembly 100. The front side 37 of the pallet assembly 20 and the front of the receiver assembly 100 may correspond to, may be aligned with and/or may be adjacent to the front of the part 12 and/or of the machine 13.

The bushings 30a, 30b may be sized to and/or may be shaped to receive the pins 102a, 102b, respectively, of the receiver assembly 100 for aligning the pallet assembly 20 with respect to the receiver assembly 100 as shown in FIG. 7. The first bushing 30a may be separated from the second bushing 30b by an angle A greater than or less than one-hundred and eighty (180) degrees as shown in FIG. 2. The angle A may be in a range between five (5) degrees and ten (10) degrees. The first bushing 30a may be located adjacent to the handle 32a and/or to the flap 34 for identifying and/or for locating the front side 37 of the pallet assembly 20. It should be understood that the angle A may be any angle capable of identifying and/or locating the front side 37 of the pallet assembly 20 as known to one of ordinary skill in the art.

The first pin 102a may be separated from the pin 102b by the angle A greater than or less than one-hundred and eighty (180) degrees. The first pin 102a of the receiver assembly 100 may correspond to, may align with and/or may be positioned adjacent to the first bushing 30a of the pallet assembly 20 for inserting into the first bushing 30a. The second pin 102b of the receiver assembly 100 may align with, may correspond with and/or may be positioned adjacent to the second bushing 30b with the first pin 102a aligned with and/or insertable into the first bushing 30a.

The angle A may prevent the first pin 102a and the second pin 102b from being inserted in the second bushing 30b and the first bushing 30a, respectively. The angle A may prevent the pins 102a, 102b from aligning with and/or from being insertable into the bushings 30a, 30b unless the first pin 102 is insertable into and/or aligned with the first bushing 30a. As a result, the front side 37 of the pallet assembly 20 adjacent to the handle 32a, the flap 34 and/or the bushing 30a may be aligned with the front of the receiver assembly 100 adjacent to the first pin 102a. Further, the angle A, the pins 102a, 102b, the bushings 30a, 30b, the handle 32a and/or the flap 34 may prevent misalignment of the part 12 and/or the pallet assembly 20 with respect to the receiver assembly 100 and/or the machine 13. As a result, the user may align the pallet assembly 20 and the receiver assembly 100 via the angle A, the pins 102a, 102b and/or the bushings 30a, 30b for attaching, for connecting and/or for securing the pallet assembly 20 and/or the part 12 to the receiver assembly 100 and/or the machine 13.

The pallet assembly 20 may have a thickness 36 defined between the top side 35 and the bottom side 28 as illustrated in FIG. 3. The thickness 36 may be in a range between three-quarters of an inch and one and one-quarter inches. The arm 24 and the pull post 26 may be attached, may be connected and/or may be secured to the bottom side 28 of the pallet assembly 20. A dowel pin 44 and/or a bolt 42 may be inserted between the pallet assembly 20 and/or the arm 24 for attaching, for connecting and/or for securing the arm 24 and/or the pull post 26 to the back side 28 of the pallet assembly 20. The bolt 42 may extend from the top side 35 of the pallet assembly 20 into the arm 24 for attaching, for connecting and/or for securing the arm 24 and/or the pull post 26 to the pallet assembly 20. The arm 24 may abut and/or may be adjacent to the bottom side 28 of the pallet assembly 20. As a result, the arm 24 and/or the pull post 26 may be attached to and/or may be secured to the pallet assembly 20 via the dowel pin 44 and/or the bolt 42.

A groove 38 may be formed and/or may be located between the arm 24 and the pull post 26 as shown in FIGS. 3 and 4. A first tapering 40 may be formed between and/or may be located between the groove 38 and the pull post 26. The first tapering 40 may be angled with respect to the pull post 26 in a range between three (3) degrees and twelve (12) degrees. The first tapering 40 and/or the pull post 26 may be pulled inwardly with respect to the compartment 115 of the receiver assembly 100 for abutting the bottom side 28 of the pallet assembly 20 against the receiver assembly 100. As a result, the part 12 and/or the pallet assembly 20 may be attached to, may be connected to and/or may be secured to the receiver assembly 100 and/or the machine 13 via the first tapering 40 and/or the pull post 26.

FIGS. 5-7 illustrate the receiver assembly 100 which may be connected to and/or may be attached to the part 12, the pallet assembly 20 and/or the machine 13 in an embodiment of the present invention. The opening 110 of the receiver assembly 100 may be located between the holes 112a, 112b or the pins 102a, 102b as shown in FIG. 5. The opening 110 may be centered with respect to the bottom side 101 of the receiver assembly 100. The holes 112a, 112b may be sized to and/or may be shaped to receive the fasteners 14a, 14b, respectively, for attaching and/or for securing the receiver assembly 100 to the surface 16 of the machine 13 via the holes 18a, 18b, respectively. The pins 102a, 102b may be sized to and/or may be shaped to be insertable into the bushings 30a, 30b, respectively. The opening 110 may be sized to and/or may be shaped to receive the arm 24 and/or the pull post 26 for attaching, for connecting and/or for securing the pallet assembly 20 to the receiver assembly 100.

As shown in the FIGS. 6 and 7, the compartment 115 of the receiver assembly 100 may be located between and/or may be formed between the holes 112a, 112b of the receiver assembly 100. The receiver assembly 100 may have a first wedge arm 114a and a second wedge arm 114b (collectively referred to hereinafter as "the wedge arms 114a, 114b") as shown in FIGS. 6 and 7. The wedge arms 114a, 114b may be located within and/or may be positioned within the compartment 115 of the receiver assembly 100. A fastener 116 may connect and/or may attach the first wedge arm 114a to the second wedge arm 114b. The fastener 116 may extend from the top side 101 through the receiver assembly 100 to the compartment 115 of the receiver assembly 100 as shown in FIGS. 5 and 6. Further, the fastener 116 may connect and/or may attach the wedge arms 114a, 114b to the receiver assembly 100. The fastener 116 may be, for example, a bolt, a screw and/or the like. The present invention should not be deemed as limited to a specific embodiment of the fastener 116 of the receiver assembly 100.

A screw 118 may be inserted between, may be located between and/or may be positioned between the receiver assembly 100 and the wedge arms 114a, 114b as shown in FIGS. 6 and 7. The screw 118 may attach, may connect and/or may secure the wedge arms 114a, 114b to the receiver assembly 100. A tip 120 of the screw 118 may be located between, may be positioned between and/or may separate the first wedge arm 114a and the second wedge arm 114b. The tip 120 of the screw 118 may abut and/or may be located adjacent to the fastener 116.

A first spring 124a may be located between, may be positioned between and/or may connect the first wedge arm 114a to the compartment 115 of the receiver assembly 100 as shown in FIG. 6. The first wedge arm 114a may have a first flange 122a for receiving, for connecting and/or for attaching the first spring 124a to the first wedge arm 114a. A second spring 124b may be located between, may be positioned and/or may connect the second wedge arm 114b to the compartment 115 of the receiver assembly 100. The second wedge arm 114b may have a second flange 122b for receiving, for connecting and/or for attaching the second spring 124b to the second wedge arm 114a. The first spring 124a and/or the second spring 124b (collectively referred to hereinafter as "the springs 124a, 124b") may be located between and/or may be positioned between the wedge arms 114a, 114b, respectively, and the receiver assembly 100.

The first spring 124a may exert and/or may apply a first force against the first wedge arm 114a to move and/or to pushed the first wedge arm 114a inwardly with respect to the second wedge arm 114b. The second spring 124b may exert and/or may apply a second force against the second wedge arm 114b to move and/or to push the second wedge arm 114b inwardly with respect to the first wedge arm 114a. The first force from the first spring 124a may be equal to and/or may be substantially similar to the second force from the second spring 124b. The wedge arms 114a, 114b may be push inwardly with respect to each other via the first force and/or the second force from the springs 124a, 124b, respectively.

Ends 152a, 152b of the pins 102a, 102b, respectively may be positioned within, may be located within and/or may be connected to the compartment 115 of the receiver assembly 100 as shown in FIG. 6. The pins 102a, 102b may extend from the top side 101 through the receiver assembly 100 to the ends 152a, 152b, respectively, and/or into the compartment 115 of the receiver assembly 100. As a result, the pins 102a, 102b may be secured to and/or may be attached to the receiver assembly 100 via the ends 152a, 152b, respectively, and/or the compartment 115 of the receiver assembly 100.

A shaft 128 may be located within, may be positioned within and/or may extend within the passage 106 of the receiver assembly 100 as shown in FIG. 6. The shaft 128 may have a head 130 and/or a fastener 132 which may be located opposite to the head 130. The head 130 and/or the fastener 132 may connect and/or may attach the shaft 128 to the receiver assembly 100 via the passage 106. The head 130 of the shaft may be located adjacent to the lock plate 108. The fastener 132 may be, for example, a bolt, a screw and/or the like. It should be understood that the fastener 132 may be any fastener capable of connecting and/or of attaching the shaft 128 to the receiver assembly 100.

The cam 126 may be located between, may be positioned between, may abut and/or may be adjacent to the wedge arms 114a, 114b as shown in FIGS. 6 and 7. The cam 126 may be located between and/or may be positioned between the head 130 and the fastener 132 of the shaft 128. The cam 126 may be connected to and/or may be attached to the shaft 128 within the passage 106 of the receiver assembly 100. More specifically, the cam 126 may be keyed to and/or may be mechanically connected to the shaft 128 for moving the wedge arms 114a, 114b inwardly or outwardly with respect to each other. The cam 126 may have a first end 127 and/or a second end 129 as shown in FIGS. 6 and 7. The cam 126 may connect the wedge arms 114a, 114b and the shaft 126 via the first end 127 and/or the second end 129 to move the receiver assembly 100 between the locked position and the unlocked position.

The shaft 128 and/or the head 130 of the shaft 128 may be rotated, may be moved and/or may be turned in a clockwise direction or a counter-clockwise direction with respect to the passage 106 of the receiver assembly 100. The cam 126 may rotate, may move and/or may turn in the clockwise direction or the counter-clockwise direction of the shaft 128 and/or the head 130 of the shaft 128. The first end 127 of the cam 126 may be located between the first wedge arm 114a and the second wedge arm 114b with the receiver assembly 100 in the locked position.

The pull post 26 of the pallet assembly 20 may be located between the wedge arm 114a, 114b with the receiver assembly 100 in the locked position. As a result, the pallet assembly 20 may be secured to, may be attached to and/or may be connected to the receiver assembly 100 via the wedge arms 114a, 114b as shown in FIGS. 6 and 7. The wedge arms 114a, 114b may abut, may be adjacent to and/or may be located in the groove 38 of the pallet assembly 20. A second tapering 117 of the wedge arms 114a, 114b may correspond to, may match and/or may abut the first tapering 40 of the pallet assembly 20. The second tapering 117 may be angled with respect to the wedge arms 114a, 114b between a range of three (3) degrees and twelve (12) degrees.

Rotating, moving and/or turning the cam 126 in the clockwise position or in the counter-clockwise position may move the second end 129 of the cam 126 with respect to the wedge arms 114a, 114b. As a result, the second end 129 of the cam 126 may be located between the first wedge arm 114a and the second wedge arm 114b with the receiver assembly 100 in the unlocked position. The wedge arms 114a, 114b may be moved, may be forced and/or may be pushed outwardly with respect to each other via the second end 129 of the cam 126. As a result, the arm 24 and/or the pull post 26 of the pallet assembly 20 may be removed from and/or may be separated from the receiver assembly 100.

The receiver assembly 100 may have a plate 134 attached to, connected to and/or secured to the compartment 115 of the receiver assembly 100 as shown in FIG. 6. The plate 134 may partially cover the first wedge arm 114a within the compartment 115 of the receiver assembly 100. The plate 134 may prevent and/or may restrict the wedge arms 114a, 114b from moving inwardly or outwardly with respect to the compartment 115 as the receiver assembly 100 may be moved between the locked position and the unlocked position. Further, the wedge arms 114a, 114b may be prevented from moving inwardly and/or outwardly with respect to the compartment 115 by the fastener 118 and/or the screw 120 as the receiver assembly 100 may be moved between the locked position and the unlocked position.

Figures 9, 10:
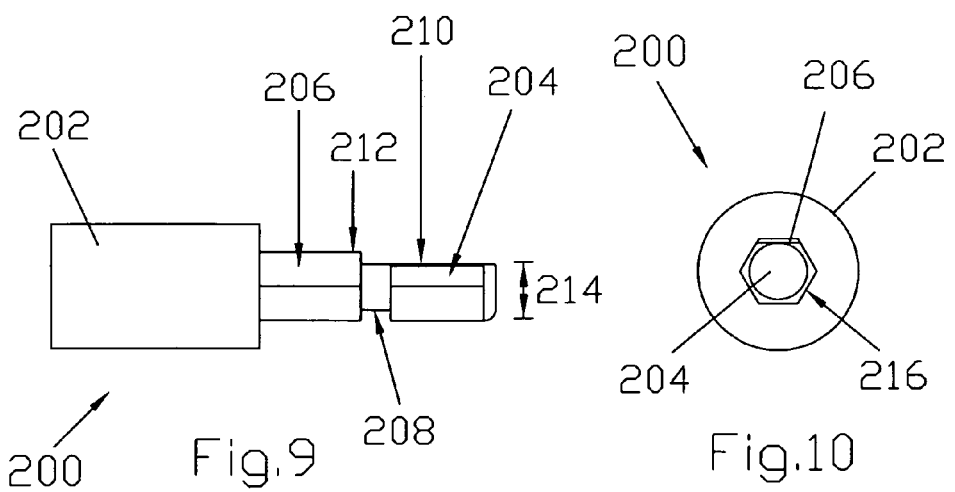
FIG. 9 illustrates a side plan view of a key for the receiver assembly in an embodiment of the present invention.
FIG. 10 illustrates a front plan view of a key for the receiver assembly in an embodiment of the present invention.

The system 10 may have a key 200 for moving, for turning and/or rotating the shaft 128 and/or the cam 126 to move the receiver assembly 100 between the locked position and the unlocked position as shown in FIGS. 9 and 10. The key 200 may have a first end 202 and a second end 204 which may be located opposite to the first end 202. The first end 202 may be configured, may be sized and/or may be shaped for attachment of a moving device (not shown in the figures) to the key 200. The second end 204 may be configured, may be sized and/or may be shaped to be insertable into the head 130 of the shaft 128 for moving, for turning and/or for rotating the shaft 128 and/or the cam 126. The moving device may be, for example, a wrench, a handle, a shaft, a rod and/or the like. It should be understood that the moving device may be any device which may be capable of attachment to the key 200 to rotate, to move and/or to turn the key 200, the shaft 128 and/or the cam 126.

A connector 206 and/or a groove 208 may be located between and/or may connect the first end 202 and the second end 204. The groove 208 and/or the second end 204 may have a first edge 210 for inserting into the passage 106 of the receiver assembly 100. The connector 206 may have a second edge 212 which may contact and/or may abut the lock plate 108 with the second end 204 of the key inserted into the passage 106 of the receiver assembly 100. The second end 204 and/or the groove 208 may have a height 214 in a range between one-quarter of an inch and three-quarters of an inch. The connector 206, the groove 208 and/or the second end 204 may have a perimeter 216 which may be shaped as, for example, a hexagon, as shown in FIG. 10. The shape of the perimeter 216 may correspond to the head 130 of the shaft 128 for inserting, for connecting and/or for attaching the key 200 to the shaft 128.

The key 200 may be inserted into the passage 106 to engage, to move, to turn and/or to rotate the shaft 128 and/or the cam 126 for moving the receiver assembly 100 between the locked position and the unlocked position. The groove 208 and/or the second end 204 may be insertable into the passage 106 between the lock plate 108 and the head 130 with the first edge 210 adjacent to the lock plate 108. As a result, the second end 204 of the key 200 may contact, may abut and/or may engage the head 130 of the shaft 128. The second edge 212 of the connector 206 may abut the lock plate 108 to prevent the connector 206 from being insertable between the lock plate 108 and the head 130. The key 200 may be removable from the passage 106 with the first groove 210 of the groove 208 and/or of the second end 204 adjacent to the lock plate 108.

The key 200 may be rotated, may be moved and/or may be turned in the clockwise direction or in the counter-clockwise direction for moving the receiver assembly 100 between the locked position and the unlocked position. The shaft 128 and/or the cam 126 may be moved, may be turned and/or may be rotated in the clockwise direction or in the counter-clockwise direction to move the first end 127 and/or the second end 129 of the cam 126 between the wedge arms 114a, 114b. As a result, the key 200, the shaft 128, the cam 126 and/or the wedge arms 114a, 114b may move the receiver assembly 100 between the locked position and the unlocked position. The groove 208 of the key 200 may be aligned with the lock plate 108 to allow the key 200 to be moved in the clockwise direction or in the counter-clockwise direction.

With the receiver assembly 100 in the unlocked position, the first edge 210 of the second end 204 and/or the groove 208 may not be adjacent to and/or may be opposite to the lock plate 108. As a result, the first edge 210 may not be aligned with the lock plate 108 to prevent the key 200 from being removed from the passage 106 with the receiver assembly 100 in the unlocked position. The key 200 may be rotated and/or may be turned in the clockwise direction or in the counter-clockwise direction for moving the receiver assembly 100 to the locked position. As a result, the first edge 210 of the groove 208 and/or of the second end 204 of the key 200 may be aligned with and/or may be adjacent to the lock plate 108 to allow the key 200 to be removed from the passage 106. The second end 204 may be attached to and/or may be separated from the head 130 of the shaft 128 with the receiver assembly 100 in the locked position.

The key 200 may not be inserted into and/or may not be removed from the passage 106 with the receiver assembly 100 in the unlocked position. The receiver assembly 100 and/or the pallet assembly 20 may not be inserted into the machine compartment for machining the part 12 with the receiver assembly 100 in the unlocked position. As a result, the part 12 and/or the pallet assembly 20 may not be separated from and/or may not be removed from the receiver assembly 100 during machining of the part 12 with the tool in the machine compartment. The receiver assembly 100 in the locked position may prevent damage to the part 12, to the pallet assembly 20, to the receiver assembly 100 and/or to the machine compartment.

The receiver assembly 100 and/or the machine 13 may be removed from the machine compartment for attaching and/or for securing the pallet assembly 20 and/or the part 12 to the receiver assembly 100 and/or to the machine 13. The key 200 may be inserted between the lock plate 108 and the passage 106 of the receiver assembly 100 to engage and/or to abut the head 130 of the shaft 128. The key 200, the shaft 128 and/or the cam 126 may be rotated in the clockwise direction or in the counter-clockwise position to move the receiver assembly 100 from the locked position to the unlocked position. As a result, the second end 129 of the cam 126 may move between the wedge arms 114a, 114b. The wedges arms 114a, 114b may move outwardly with respect to each other via the second end 129 of the cam 126 and/or the key 200. As a result, the receiver assembly 100 may be moved to the unlocked position via the key 200 and/or the cam 126.

The part 12 may be attached and/or may be secured to the top side 35 of the pallet assembly 20 via the openings 22a-22c. The arm 24 and the pull post 26 of the pallet assembly 20 may be inserted into and/or may be positioned inside the opening 110 of the receiver assembly 100 with the receiver assembly 100 in the unlocked position. The first tapering 40 of the pallet assembly 20 may be adjacent to and/or may abut the second tapering 117 of the wedge arms 114a, 114b for securing the pallet assembly 20 to the receiver assembly 100. The groove 38 of the pallet assembly 20 may be adjacent to, may be positioned between and/or may abut the wedge arms 114a, 114b.

The key 200, the shaft 128 and/or the cam 126 may be moved and/or may be rotated in a clockwise direction or in a counter-clockwise direction to move the receiver assembly from the unlocked position to the locked position. The first end 127 of the cam 126 may move between and/or may be position between the wedge arms 114a, 114b. The wedge arms 114a, 114b may move inwardly with respect to each other with the first end 127 of the cam 126 between the wedge arms 114a, 114b. The arm 24 and/or the pull post 26 may be secured between the wedge arms 114a, 114b for attaching the pallet assembly 20 to the receiver assembly 100. As a result, the receiver assembly 100 may be in the locked position for attaching the pallet assembly 20 to the receiver assembly 100 and/or the machine 13. The first tapering 40 of the pallet assembly 20 may engage and/or may contact the second tapering 117 of the wedge arms 114a, 114b to move the pallet assembly 20 inwardly with respect to the receiver assembly 100. As a result, the bottom side 28 of the pallet assembly 20 may be adjacent to and/or may abut the receiver assembly 100 with the receiver assembly 100 in the locked position.

The pull post 26 may be positioned between and/or may located between the wedge arms 114a, 114b for attaching the pallet assembly 20 and the part 12 to the receiver assembly 100 and/or to the machine 13. The first force and/or the second force of the springs 124a, 124b, respectively, may be applied to and/or exerted onto the pull post 26 and/or the groove 38 via the wedge arms 114a, 114b, respectively, with the receiver assembly 100 in the locked position. The springs 124a, 124b, the first tapering 40 and/or the second tapering 117 may secure and/or may attach the arm 24 and/or the pull post 26 between the wedge arms 114a, 114b. As a result, the pallet assembly 20 and/or the part 12 may be secured to, may be attached to and/or may be connected to the receiver assembly 100 and/or the machine 13 with the receiver assembly 100 in the locked position.

The key 200 may be separated from and/or may be removed from the head 130 of the shaft 128 with the receiver assembly 100 in the locked position. The key 200 may be removed from the lock plate 108 and the passage 106 of the receiver assembly 100 with the receiver assembly 100 in the locked position. The receiver assembly 100, the pallet assembly 20, the part 12 and/or the machine 13 may be inserted into and/or may be positioned inside the machine compartment with the receiver assembly 100 in the locked position. Doors (not shown in the figures) to the machine compartment may be moved from an open position to a closed position for securing the part 12, the pallet assembly 20, the receiver assembly 100 and/or the machine 13 inside the machine compartment for machining the part 12. As a result, the part 12, the pallet assembly 20, the receiver assembly 100 and/or the machine 13 may be enclosed inside the machine compartment with the doors in the closed position.

The part 12 may be machined inside and/or may be moved inside the machine compartment via the machine 13 with the receiver assembly 100 in the locked position. As a result, the part 12 may be secured to, may be attached to and/or may be connected to the receiver assembly 100 and/or the machine 13 as the tool may machine the part 12 inside the machine compartment. Machining of the part 12 via the tool may require the part 12 to be moved along the first axis, the second axis, the third axis, the fourth axis and/or the fifth axis inside the machine compartment. The part 12, the machine 13, the receiver assembly 100 and/or the pallet assembly 20 may move along the first axis, the second axis, the third axis, the fourth axis and/or the fifth axis inside the machine compartment for machining the part 12. As a result, the part 12 may move in the two-axis movement, the three-axis movement, the four-axis movement or the five-axis movement inside the machine compartment for machining the part 12 with the tool.

The part 12 which may have been machined by the tool may be removed from the machine compartment via the machine 13, the pallet assembly 20 and/or the receiver assembly 100. The doors of the machine compartment may be moved from the closed position to the open position to permit the part 12, the machine 13, the pallet assembly 20 and/or the receiver assembly 100 to be removed from the machine compartment. The key 200 may be inserted between the lock plate 108 and the passage 106 of the receiver assembly 100 to engage and/or to abut the head 130 of the shaft 128. The key 200 may be move and/or may be rotated in the clockwise direction or in the counter-clockwise direction to move the receiver assembly 100 from the locked position to the unlocked position.

The cam 126 may move and/or may rotate in the clockwise direction or in the counter-clockwise direction to move the second end 129 of the cam between the wedge arms 114a, 114b. As a result, the wedge arms 114a, 114b may move outwardly with respect to each other for moving the receiver assembly 100 from the locked position to the unlocked position. The arm 24 and/or the pull post 26 of the pallet assembly may be removed from and/or may be separated from the opening 110 and/or the wedge arms 114a, 114b of the receiver assembly 100. As a result, the part 12 and/or the pallet assembly 20 may be separated from and/or may be removed from the receiver assembly 100 with the receiver assembly 100 in the unlocked position.

The system 10 may attach, may secure and/or may connect the part 12 and/or the pallet assembly 20 to the receiver assembly 100 for machining the part 12. The groove 38 and/or the pull post 26 of the pallet assembly 20 may be inserted between the wedge arms 114a, 114b of the receiver assembly 100. The springs 122a, 122b of the receiver assembly 100 may exert and/or may apply the first force and the second force, respectively, against the wedge arm 114a, 114b. The key 200 and/or the cam 126 may move and/or may rotate to move the wedge arms 114a, 114b and/or the receiver assembly 100 between the locked position and the unlocked position. The first tapering 40 of the pallet assembly 20 may engage and/or may correspond to the second tapering 117 of the wedge arms 114a, 114b to lock, to secure, to attach and/or to connect the pallet assembly 20 to the receiver assembly 100 in the locked position. The plate 134 of the receiver assembly 100 may prevent the cam 126 from rotating the first wedge arm 114a within the compartment 115 of the receiver assembly 100. The lock plate 108 may prevent the key 200 from being removed from and/or from being separated from the receiver assembly 100 in the unlocked position.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A system for securing a part wherein the part is machinable by a tool, the system comprising:
 a pallet assembly having a diameter defined between a front side and a back side wherein the back side is positioned opposite to the front side wherein the pallet assembly has a thickness defined between a top side and a bottom side wherein bottom side is positioned opposite to the top side wherein the pallet assembly has a post attached to the bottom side wherein the tool is place on the top side of the pallet assembly;
 a bushing extending from the bottom side of the pallet assembly inwardly with respect to the top side of the pallet assembly;
 a receiver assembly having a height defined between a top side and a bottom side wherein a compartment is formed in the receiver assembly;
 a pin extending outwardly with respect to the top side of the receiver assembly wherein the pin mates with the bushing of the pallet assembly to align the receiver assembly with the pallet assembly;
 a first arm attached to the receiver assembly wherein the first arm is located in the compartment of the receiver assembly wherein the first arm moves between a first position and a second position wherein the post of the pallet assembly is insertable into the compartment of the receiver assembly with the first arm in the first position and further wherein the pallet assembly is attachable to the receiver assembly with the first arm in the second position;
 a cam connected to the receiver assembly wherein the cam is located in the compartment of the receiver assembly wherein the cam moves the first arm between the first position and the second position; and
 a flap formed at the the front side of the pallet assembly between the bottom side of the pallet assembly and the top side of the pallet wherein the flap identifies the front side of the pallet assembly.

2. The system of claim 1 further comprising:
 a plate attached to the receiver assembly wherein the plate prevents the first arm from moving between the first position and the second position.

3. The system of claim 1 further comprising:
 a key connectable to the cam wherein the key moves the first arm between the first position and the second position.

4. The system of claim 1 further comprising:
a groove in the pallet assembly wherein the groove is located between the bottom side of the pallet assembly and the post.

5. The system of claim 1 further comprising:
a second arm attached to the first arm wherein the cam is located between the first arm and the second arm.

6. The system of claim 1 wherein the pallet assembly has a tapered surface angled in a range between five degrees and ten degrees wherein the tapered surface attaches the pallet assembly to the receiver assembly.

7. The system of claim 1 further comprising:
a spring connected to the first arm and the receiver assembly wherein the spring attaches the pallet assembly to the receiver assembly.

\* \* \* \* \*